(12) United States Patent
Sakuda et al.

(10) Patent No.: US 9,586,611 B2
(45) Date of Patent: Mar. 7, 2017

(54) STEERING SYSTEM

(71) Applicant: JTEKT CORPORATION, Osaka-shi, Osaka (JP)

(72) Inventors: Masayoshi Sakuda, Kashihara (JP); Ryota Okano, Hamamatsu (JP); Michi Kikuiri, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/044,712

(22) Filed: Feb. 16, 2016

(65) Prior Publication Data
US 2016/0244087 A1  Aug. 25, 2016

(30) Foreign Application Priority Data

Feb. 23, 2015  (JP) .................................. 2015-033328
Jul. 7, 2015    (JP) .................................. 2015-136230

(51) Int. Cl.
| | | |
|---|---|---|
| *B62D 1/19* | (2006.01) | |
| *B62D 1/18* | (2006.01) | |
| *B62D 1/185* | (2006.01) | |
| *B62D 1/184* | (2006.01) | |

(52) U.S. Cl.
CPC ................. *B62D 1/19* (2013.01); *B62D 1/18* (2013.01); *B62D 1/184* (2013.01); *B62D 1/185* (2013.01)

(58) Field of Classification Search
CPC . B62D 1/19; B62D 1/18; B62D 1/184; B62D 1/185
See application file for complete search history.

(56) References Cited

U.S. PATENT DOCUMENTS

| | | | |
|---|---|---|---|
| 5,125,685 A | | 6/1992 | Takahashi et al. |
| 5,348,345 A | * | 9/1994 | Dykema .................. F16C 3/03 280/777 |

(Continued)

FOREIGN PATENT DOCUMENTS

| | | |
|---|---|---|
| EP | 1 661 790 A1 | 5/2006 |
| EP | 2 311 711 A1 | 4/2011 |

(Continued)

OTHER PUBLICATIONS

Jul. 26, 2016 Extended Search Report issued in European Application No. 16156004.0.

*Primary Examiner* — Drew Brown
(74) *Attorney, Agent, or Firm* — Oliff PLC

(57) ABSTRACT

A steering system includes an outer jacket including a pair of clamped portions disposed on both sides of a slit, an inner jacket coated with an insulating coating layer all along an outer periphery of the inner jacket except for a predetermined area, an upper bracket that supports the clamped portions and that is fixed to a vehicle body, and a clamping mechanism including a clamping shaft that is supported in clamping shaft insertion holes in the clamped portions so as to be energized. The steering system further includes a conductive elastic member including a first portion engaged with one of a slit inside portion of the clamping shaft positioned in the slit and the predetermined area so as to be energized and a second portion that slide-contacts the other of the slit inside portion and the predetermined area.

6 Claims, 11 Drawing Sheets

(56) References Cited

U.S. PATENT DOCUMENTS

2007/0137377 A1\* 6/2007 Kamei .................. B62D 1/195
　　　　　　　　　　　　　　　　　　　　　　74/493
2011/0163524 A1\* 7/2011 Aota ..................... B60R 16/027
　　　　　　　　　　　　　　　　　　　　　　280/779

FOREIGN PATENT DOCUMENTS

| JP | S53-140233 U | 11/1978 |
| JP | S63-28077 U | 2/1988 |
| JP | 2005-022450 A | 1/2005 |
| JP | 2009-006962 A | 1/2009 |
| JP | 2013-224064 A | 10/2013 |
| JP | 2014-058288 A | 4/2014 |
| WO | 2015/190301 A1 | 12/2015 |

\* cited by examiner

1

STEERING SYSTEM

INCORPORATION BY REFERENCE

The disclosure of Japanese Patent Applications No. 2015-033328 filed on Feb. 23, 2015 and No.2015-136230 filed on Jul. 7, 2015 including the specification, drawings and abstract, is incorporated herein by reference in its entirety.

BACKGROUND OF THE INVENTION

1. Field of the Invention

The invention relates to a steering system.

2. Description of the Related Art

In a steering column of a steering apparatus described in Japanese Patent Application Publication No. 2009-006962 (JP 2009-006962 A), an inner column supports a steering shaft such that the steering shaft is rotatable. The inner column is slidably held by an outer column. The steering wheel is installed on the steering shaft. The outer column is supported by a vehicle-body-side upper bracket so as to be movable in an up-down direction. A current conduction member forming an electrically continuous path is disposed between the outer column and the vehicle-body-side upper bracket.

A steering column of a steering system described in Japanese Patent Application Publication No. 2013-224064 (JP 2013-224064 A) has an outer tube and an inner tube that are movable relative to each other. The inner tube is rotatably coupled to a lower column bracket. A housing tube disposed on an axis of the inner tube is grounded to the vehicle body via a conductive bushing, a conductive plate, and a bracket.

For a column jacket, a configuration may be adopted in which an outer periphery of an inner jacket is coated with an insulating coating layer, for example, so that friction between the inner jacket and an outer jacket is reduced. In this case, the inner jacket and the outer jacket are not directly electrically connected to each other. Thus, when this configuration is applied to JP 2009-006962 A or JP 2013-224064 A, an energizing path from equipment attached to the inner jacket to the vehicle body (energizing path for grounding) may fail to be established.

SUMMARY OF THE INVENTION

It is an object of the invention to provide a steering system in which an inner jacket is coated with a coating layer and which allows a grounding current conduction path to be established.

According to an aspect of the invention, a steering system includes: a steering shaft to which a steering member is coupled and which is enabled to extend and contract in an axial direction; a column jacket including an outer jacket that includes a slit and a pair of clamped portions disposed on both sides of the slit, and an inner jacket fitted into the outer jacket and coated with an insulating coating layer all along an outer periphery of the inner jacket except for a predetermined area, the column jacket supporting the steering shaft so that the steering shaft is rotatable and being enabled to extend and contract in the axial direction; a bracket that supports the clamped portions of the outer jacket and that is fixed to the vehicle body, a clamping mechanism including a clamping shaft that is supported in clamping shaft insertion holes in the clamped portions so as to be energized and that clamps the clamped portions via the clamping shaft so that the outer jacket holds the inner jacket; and a conductive elastic member including a first portion engaged with one of a slit inside portion of the clamping shaft that is positioned in the slit and the predetermined area so as to be energized and a second portion that slide-contacts the other of the slit inside portion and the predetermined area.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
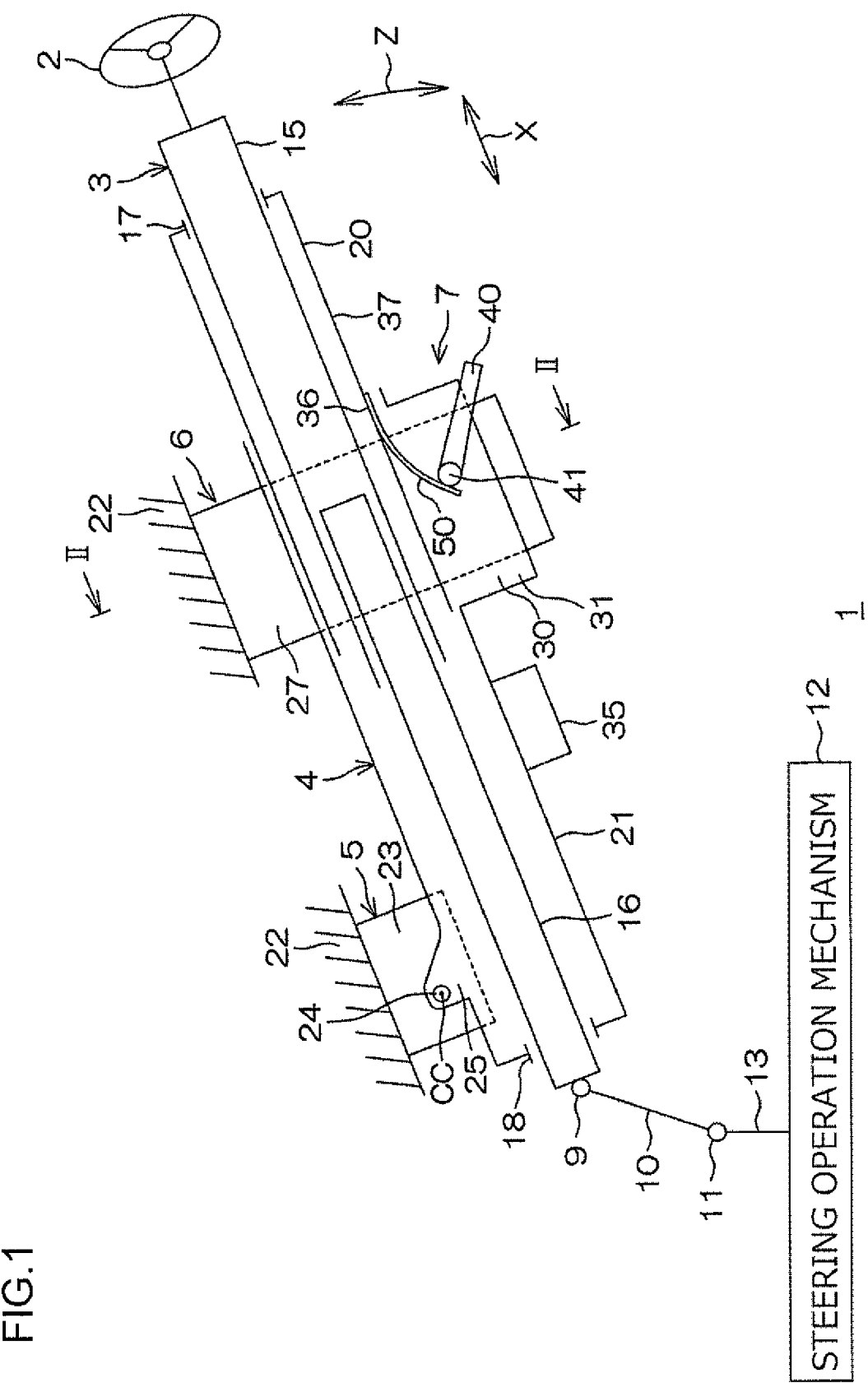
FIG. 1 is a schematic side view of a steering system according to a first embodiment of the present invention.

Embodiments of the invention will be described below with reference to the attached drawings. FIG. 1 is a schematic side view of a steering system 1 according to a first embodiment of the invention. As seen in FIG. 1, the steering system 1 includes a steering shaft 3, a column jacket 4, a lower bracket 5, an upper bracket (bracket) 6, and a clamping mechanism 7.

A steering member 2 such as a steering wheel is coupled to the steering shaft 3 at one end thereof in an axial direction X. The other end of the steering shaft 3 is coupled to a pinion shaft 13 of a steering operation mechanism 12 via a universal joint 9, an intermediate shaft 10, and a universal joint 11 in this order. The steering operation mechanism 12 is, for example, a rack-and-pinion mechanism that steers steered wheels (not depicted in the drawings) in conjunction with steering of the steering member 2. Rotation of the steering member 2 is transmitted to the steering operation mechanism 12 via the steering shaft 3, the intermediate shaft 10, and the like. The rotation transmitted to the steering operation mechanism 12 is converted into axial movement of a rack shaft not depicted in the drawings. Thus, the steered wheels are steered.

The steering shaft 3 has a tubular upper shaft 15 and a tubular lower shaft 16 that are fitted together by, for example, spline fitting or serration fitting so as to be slidable relative to each other. The steering shaft 3 can extend and contract in the axial direction X. The column jacket 4 includes an outer jacket 21 and a tubular inner jacket 20. The outer jacket 21 is disposed on a lower side of the steering shaft 3 in the axial direction X. The inner jacket 20 is disposed above the outer jacket 21 in the axial direction X and is fitted in the outer jacket 21. The inner jacket 20 and the outer jacket 21 can slide relative to each other in the axial direction X.

The inner jacket 20 supports the upper shaft 15 via a bearing 17 so that the upper shaft 15 is rotatable. The outer jacket 21 supports the lower shaft 16 via a bearing 18 so that the lower shaft 16 is rotatable. The column jacket 4 supports the steering shaft 3 via the bearings 17 and 18 so that the steering shaft 3 is rotatable. The column jacket 4 can extend and contract in the axial direction X along with the steering shaft 3.

The lower bracket 5 includes a fixed bracket 23, a tilt support shaft 24, and a column bracket 25. The fixed bracket 23 is fixed to a vehicle body 22. The tilt support shaft 24 is supported by the fixed bracket 23. The column bracket 25 is fixed to an outer periphery of the outer jacket 21 and rotatably supported by the tilt support shaft 24. The column jacket 4 and the steering shaft 3 can pivot (can tilt) in a tilt direction Z using, as a point of support, a tilt center CC that is a central axis of the tilt support shaft 24.

The steering shaft 3 and the column jacket 4 are pivoted (tilted) around the tilt center CC. Thus, the position of the steering member 2 is adjusted in the tilt direction Z (what is called tilt adjustment). The steering shaft 3 and the column jacket 4 are extended and contracted in the axial direction X. Thus, the position of the steering member 2 is adjusted in a telescopic direction (axial direction X) (what is called telescopic adjustment). The inner jacket 20 and the outer jacket 21 can slide relative to each other in the axial direction X for the telescopic adjustment.

Figure 2:
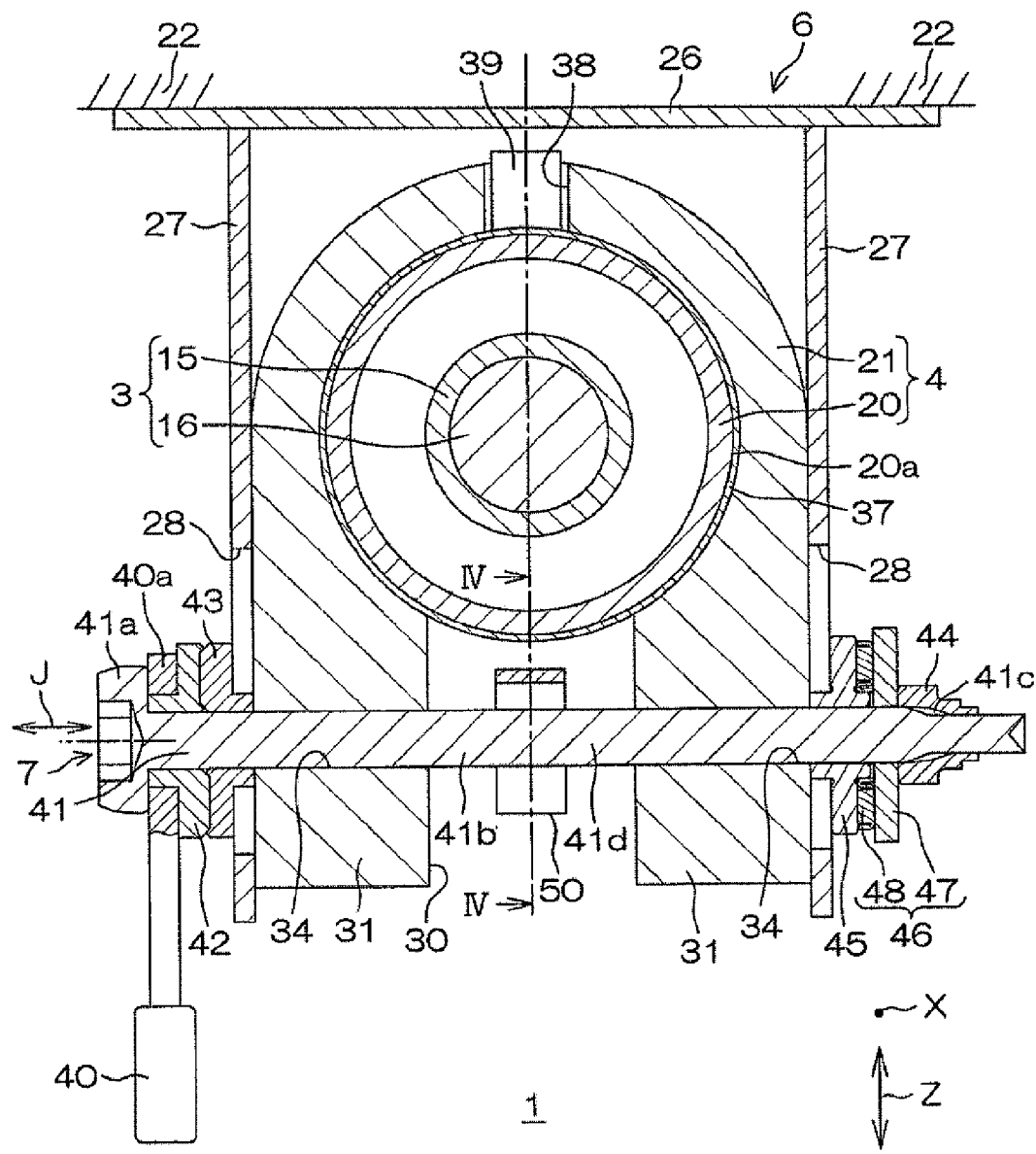
FIG. 2 is a sectional view taken along line in FIG. 1.
Figure 3:
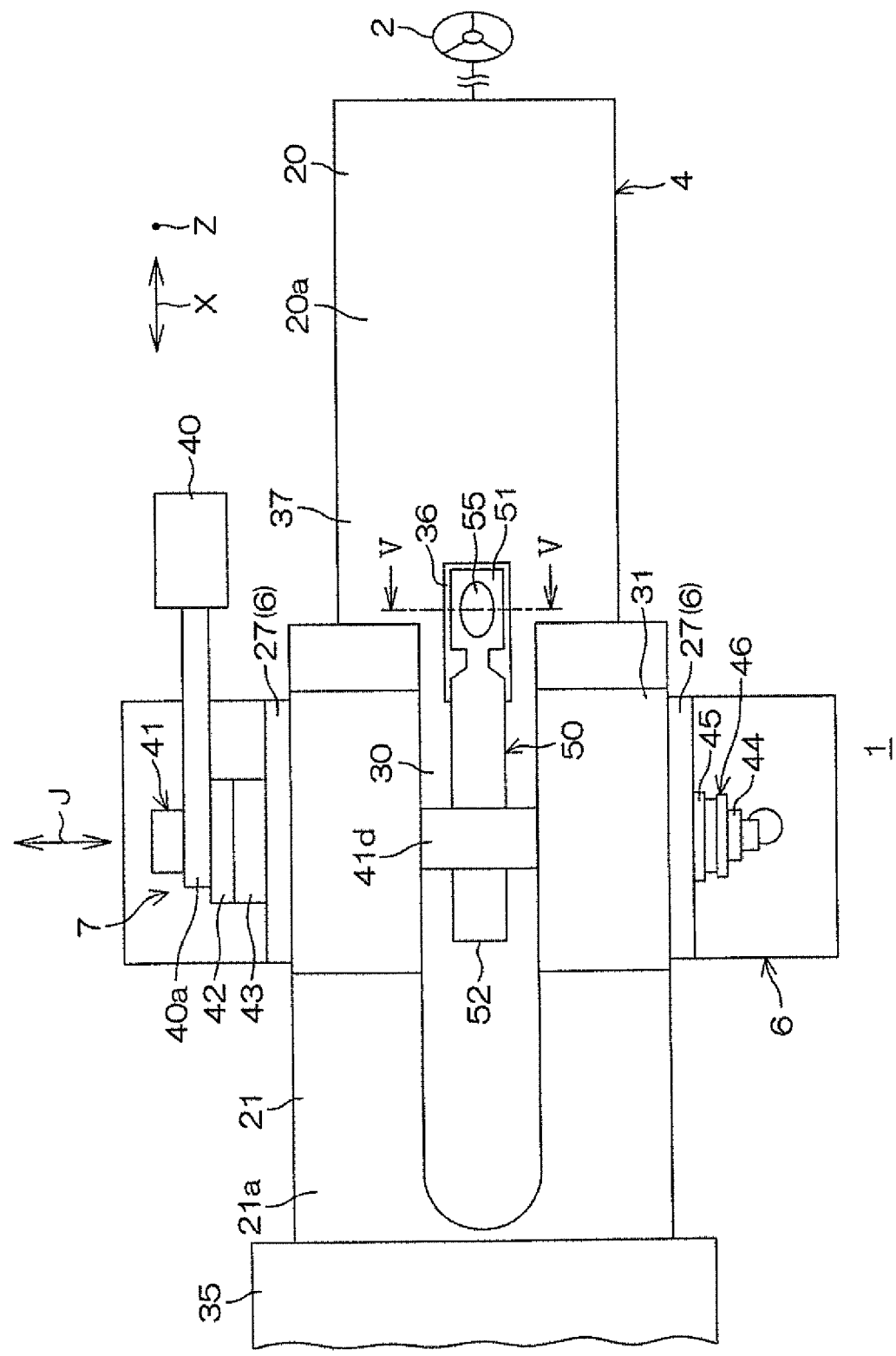
FIG. 3 is a diagram of peripheries of a clamping mechanism as viewed from below in a tilt direction.

FIG. 2 is a sectional view taken along line II-II in FIG. 1. FIG. 3 is a diagram of peripheries of the clamping mechanism 7 as viewed from below in the tilt direction Z. With reference to FIG. 2, the upper bracket 6 supports the outer jacket 21. The upper bracket 6 includes a top plate 26 and a pair of side plates 27. The top plate 26 is fixed to the vehicle body 22 via bolts or the like not depicted in the drawings. The side plates 27 extend downward from the top plate 26 in the tilt direction Z. A tilting long groove 28 extending in the tilt direction Z is formed in each of the side plates 27.

The outer jacket 21 includes a slit 30 and a pair of clamped portions 31. In a lower portion of the outer jacket 21 in the tilt direction Z, the slit 30 extends in the axial direction X from an upper end of the outer jacket 21 in the axial direction X. The clamped portions 31 are disposed on both sides of the slit 30. The slit 30 is exposed on the exterior of the outer jacket 21 and in a range from an upper portion to a lower portion of the outer jacket 21 in the axial direction X and the lower portion of the outer jacket 21 in the tilt direction Z.

The clamped portions 31 are integrated with the outer jacket 21. A clamping shaft insertion hole 34 is formed in each of the clamped portions 31 so as to penetrate the clamped portion 31. The clamped portions 31 are supported by the upper bracket 6 so as to be energized. As seen in FIG. 3, an attached component 35 such as a key lock main body is attached to an area of the outer jacket 21 that lies below the clamped portions 31 in the axial direction X, At least a part of the attached component 35 protrudes from an outer peripheral surface 21a of the outer jacket 21.

An outer periphery 20a of the inner jacket 20 is coated with an insulating coating layer 37 except for a predetermined area 36. The predetermined area 36 is formed by masking processing or the like in a coating step for the coating layer 37. The predetermined area 36 is formed on a portion of the outer periphery 20a that is different from a portion thereof that comes into slidable contact with the outer jacket 21 during the telescopic adjustment. The predetermined area 36 is preferably disposed inside the slit 30 as viewed in the axial direction X.

The coating layer 37 is formed of, for example, a friction reduction material that is used to reduce friction generated during relative sliding between the inner jacket 20 and the outer jacket 21. As seen in FIG. 2, a guide groove 38 that is a groove extending in the axial direction X is formed in the outer jacket 21. On the outer periphery 20a of the inner jacket 20, a guided protrusion 39 is provided which is, for example, a resin pin inserted through the guide groove 38. The guide groove 38 and the guided protrusion 39 engage with each other to prevent the inner jacket 20 from rotating relative to the outer jacket 21, and to guide axial movement of the inner jacket 20 with respect to the outer jacket 21.

The clamping mechanism 7 includes an operation member 40, a clamping shaft 41, a cam member 42, and a first clamping member 43. The operation member 40 is manually rotated by a driver or the like. The operation member 40 is attached to one end of the clamping shaft 41. The cam member 42 rotates integrally with the operation member 40. The first clamping member 43 is a non-rotating cam that engages with the cam member 42. The clamping shaft 41 is inserted through the long grooves 28 in the upper bracket 6 and through the clamping shaft insertion holes 34 in the clamped portions 31. Thus, the clamping shaft 41 is rotatably supported by the clamped portions 31 so as to be energized.

A base end 40a of the operation member 40 at one end thereof in a longitudinal direction, the cam member 42, and the first clamping member 43 are supported by a shaft portion 41b of the clamping shaft 41 between a head 41a of the clamping shaft 41 and one of the side plates 27. Movement of the cam member 42 with respect to the clamping shaft 41 in an axial direction J is restricted. The first clamping member 43 is movable in the axial direction J. The steering system 1 includes a nut 44, a second clamping member 45, and an interposition member 46. The nut 44 engages threadably with a threaded portion 41c of the clamping shaft 41. The second clamping member 45 is interposed between the other side plate 27 and the nut 44. The interposition member 46 is interposed between the second clamping member 45 and the nut 44.

Near the nut 44, the second clamping member 45 and the interposition member 46 are supported by the shaft portion 41b of the clamping shaft 41 so as to be movable in the axial direction J of the clamping shaft 41. The interposition member 46 includes a washer 47 and a needle roller bearing 48. The washer 47 is interposed between the nut 44 and the second clamping member 45. The needle roller bearing 48 is interposed between the washer 47 and the second clamping member 45. In conjunction with a rotating operation of the operation member 40 in a lock direction (lock operation), the cam member 42 rotates with respect to the non-rotating cam (first clamping member 43). Thus, the first clamping member 43 moves in the axial direction J of the clamping shaft 41. Consequently, both side plates 27 of the upper bracket 6 are sandwiched between the first clamping member 43 and the second clamping member 45. The clamped portions 31 are clamped by the side plates 27.

Thus, the slit 30 between the clamped portions 31 is narrowed to reduce the diameter of the outer jacket 21. As a result, the outer jacket 21 is pressed against the inner jacket 20 to hold the inner jacket 20. In this mariner, the clamping mechanism 7 clamps the clamped portions 31 via the clamping shaft 41. This allows the outer jacket 21 to hold the inner jacket 20. Consequently, tilt lock and telescopic lock are achieved. At this time, the state of the steering system 1 is referred to as a locked state. In contrast, the state of the steering system 1 when tilt lock and telescopic lock are released is referred to as an unlocked state.

Figure 4:
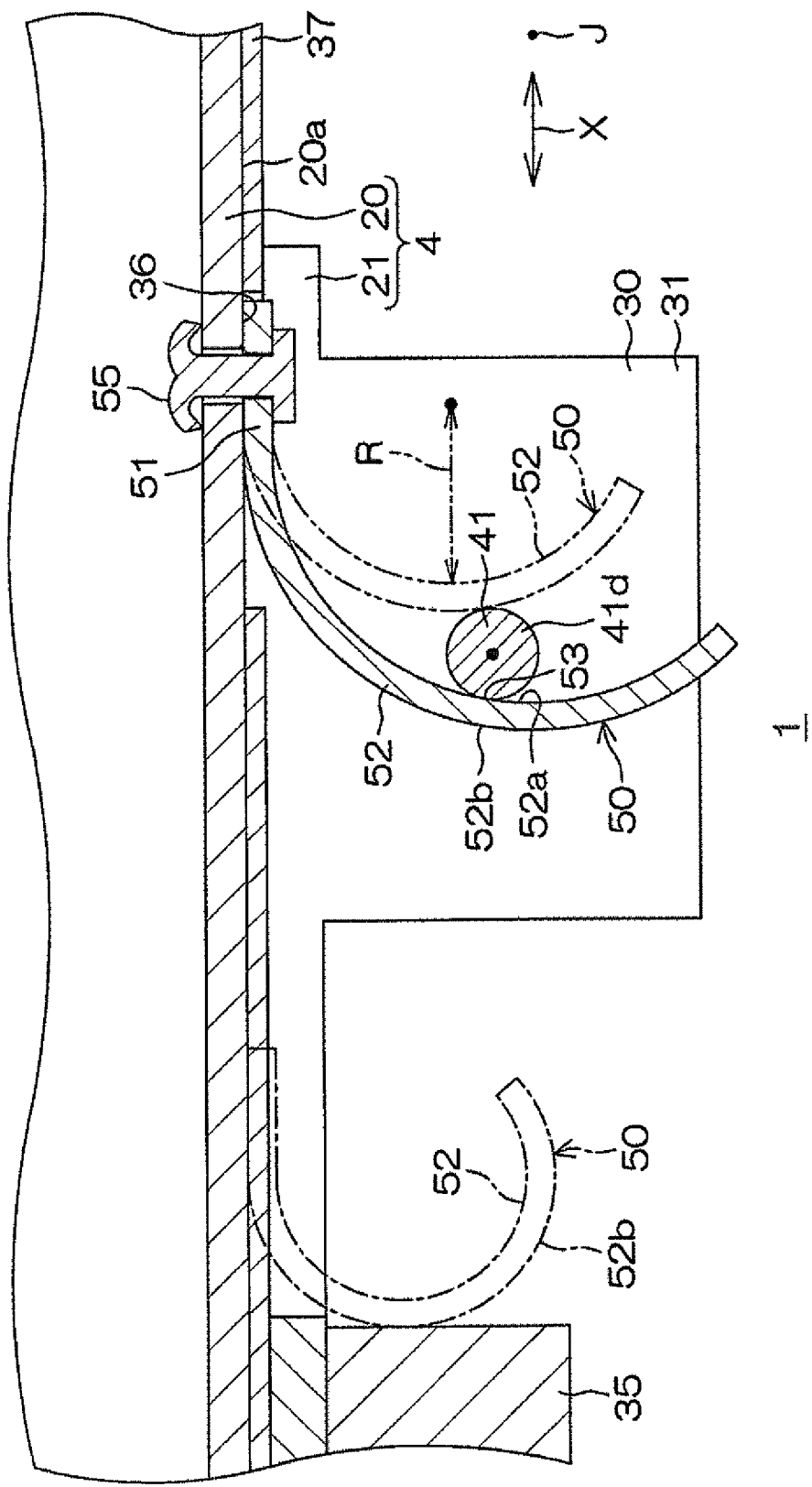
FIG. 4 is a sectional view taken along line IV-IV in FIG. 2, illustrating that a column jacket has been maximally contracted by telescopic adjustment.
Figure 5:
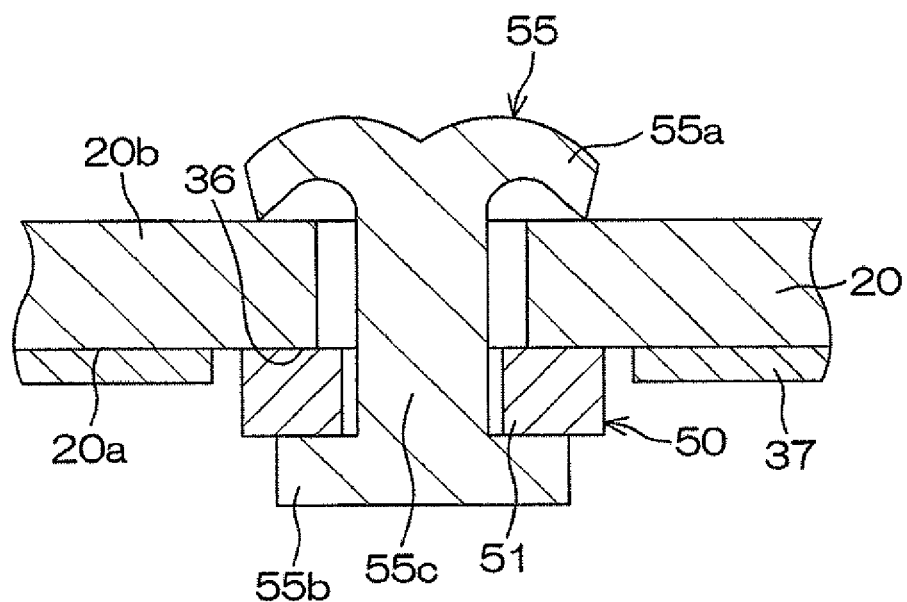
FIG. 5 is a sectional view taken along line V-V in FIG. 3.

FIG. 4 is a sectional view taken along line IV-IV in FIG. 2, illustrating that the column jacket 4 has been maximally contracted by the telescopic adjustment. FIG. 5 is a sectional view taken along line V-V in FIG. 3. As seen in FIG. 4, the steering system 1 includes a conductive elastic member 50 that is, for example, a metallic leaf spring.

The elastic member 50 includes a first portion 51 and a second portion 52. The first portion 51 is engaged with the predetermined area 36 so as to be energized. The second portion 52 slides from the attached component 35 (from below in the axial direction X) and comes into contact with a slit inside portion 41d of the clamping shaft 41 positioned in the slit 30. The second portion 52 is shaped like a curved plate as viewed in the axial direction J of the clamping shaft 41 (in a direction orthogonal to the drawing plane of FIG. 4).

The second portion 52 includes an inner curved surface 52a and an outer curved surface 52b. The inner curved surface 52a is provided with a contact portion 53 that slid-contacts an outer periphery of the slit inside portion 41d of the clamping shaft 41 so as to be energized. The outer curved surface 52b and the attached component 35 face each other in the axial direction X. The first portion 51 is formed like a flat plate extending from one end of the second portion 52 in a tangential direction along the axial direction X. The predetermined area 36 is provided with an engagement member 55 that allows the first portion 51 of the elastic member 50 to engage with the inner jacket 20.

As seen in FIG. 5, the engagement member 55 is made from, for example, resin. The engagement member 55 includes an elastically deformable elastic-deformation portion 55a, a reception portion 55b, and a coupling portion 55c. The reception portion 55b receives a wall portion 20b of the inner jacket 20 and the first portion 51 of the elastic member 50 in the predetermined area 36, which are biased by the elastic-deformation portion 55a. The coupling portion 55c couples the elastic-deformation portion 55a and the reception portion 55b together. The wall portion 20b of the inner jacket 20 and the first portion 51 of the elastic member 50 in the predetermined area 36 are sandwiched between the reception portion 55b and the elastic-deformation portion 55a of the engagement member 55. Thus, the first portion 51 is engaged with the predetermined area 36 and in contact with the wall portion 20b so as to be energized.

The first portion 51 is engaged with the predetermined area 36 of the inner jacket 20. Thus, during the telescopic adjustment, the first portion 51 moves integrally with the inner jacket 20 in the axial direction X. As depicted by a continuous line in FIG. 4, with the column jacket 4 maximally contracted by the telescopic adjustment, the second portion 52 is elastically deformed by the clamping shaft 41 so that the radius of curvature of the second portion 52 is larger than the radius of curvature R thereof in a free state where the second portion 52 is not elastically deformed (see a long dashed double-short dashed line in FIG. 4). Thus, the second portion 52 is pressed against the slit inside portion 41d of the clamping shaft 41 by a restoring force of the second portion 52 for the free state. The inner curved surface 52a of the second portion 52 is provided with the contact portion 53 that contacts the slit inside portion 41d.

Figure 6:
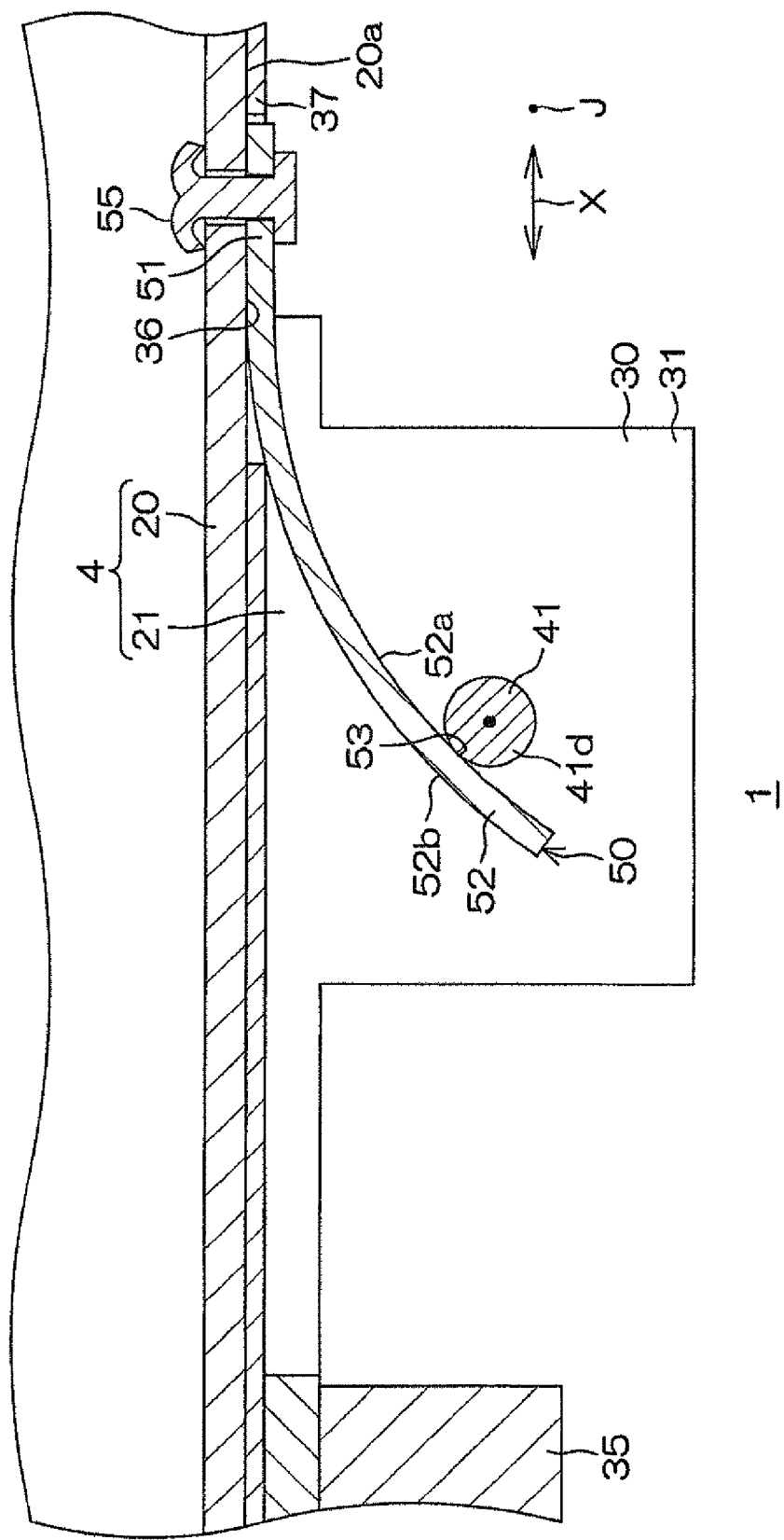
FIG. 6 is a diagram illustrating that the column jacket has been maximally extended by telescopic adjustment.

When the column jacket 4 is maximally extended by the telescopic adjustment as depicted in FIG. 6, the second portion 52 is elastically deformed by the clamping shaft 41 so as to have a further larger radius of curvature than the radius of curvature thereof when the column jacket 4 is maximally contracted (see a continuous line in FIG. 4). Thus, the second portion 52 is pressed against the slit inside portion 41d of the clamping shaft 41 by the restoring force of the second portion 52 for the free state.

Thus, within the range of the telescopic adjustment, the elastic member 50 is elastically deformed so as to keep the second portion 52 in contact with the slit inside portion 41d of the clamping shaft 41. Now, operations of the members performed at the time of a secondary collision will be described. At the time of the secondary collision, a load from the steering member 2 (see FIG. 1) is transmitted to the inner jacket 20. The inner jacket 20 is then caused to move to the opposite side from the steering member 2 in the axial direction X. The first portion 51 of the elastic member 50 engaged with the predetermined area 36 of the inner jacket 20 moves along with the inner jacket 20. The clamping shaft 41 is supported by the clamped portions 31 of the outer jacket 21. Consequently, the clamping shaft 41 does not move in the axial direction X at the time of the secondary collision. Accordingly, the second portion 52 of the elastic member 50 gradually returns to the free state (the state with the radius of curvature R) present before the elastic deformation occurs. Upon returning to the free state (the state with the radius of curvature R), the second portion 52 leaves the clamping shaft 41 and moves downward in the axial direction X along with the inner jacket 20 and the first portion 51.

As described above, the attached component 35 supported by the outer jacket 21 is disposed below the clamping shaft 41 in the axial direction X. The outer curved surface 52b of the second portion 52 faces the attached component 35 in the axial direction X. Thus, when a secondary collision occurs, the outer curved surface 52b of the second portion 52, which faces the attached component 35 in the axial direction X, eventually comes into contact with the attached component 35. The outer curved surface 52b of the second portion 52 comes into contact with the attached component 35 to elastically deform the second portion 52 so that the radius of curvature R of the second portion 52 is smaller than the radius of curvature thereof in the free state (see the long dashed double-short dashed line in FIG. 4).

In the first embodiment, the conductive elastic member 50 enables current to be passed to the predetermined area 36 of the outer periphery 20a of the inner jacket 20, which is not coated with the insulating coating layer 37, through the slit inside portion 41d of the clamping shaft 41 supported by the clamped portions 31 so as to be energized. Consequently, the inner jacket 20 and the outer jacket 21 can be electrically connected to each other via the elastic member 50 and the clamping shaft 41. Thus, equipment (not depicted in the drawings) attached to the inner jacket 20 can be electrically connected to the vehicle body 22 via the inner jacket 20, the elastic member 50, the clamping shaft 41, the outer jacket 21, and the upper bracket 6.

Therefore, in a configuration in which the inner jacket 20 is coated with the coating layer 37, an energizing path (energizing path for grounding) from the equipment (not depicted in the drawings) attached to the inner jacket 20 to the vehicle body 22 can be established. The inner jacket 20 and the outer jacket 21 can be electrically connected to each other using a relatively few members including the elastic member 50 and the clamping shaft 41. This configuration enables a reduction in the length of an energizing path for grounding as compared to a case where a large number of components are interposed between the inner jacket 20 and the outer jacket 21.

Within the range of the telescopic adjustment, the second portion 52 of the elastic member 50 is elastically deformed so as to be kept in contact with the slit inside portion 41d of the clamping shaft 41. Consequently, the grounding current conduction path can be established even if the inner jacket 20 is moved with respect to the outer jacket 21 to whichever position within the range of the telescopic adjustment. During the telescopic adjustment, the second portion 52 is also kept in contact with the slit inside portion 41d. Thus, the inner jacket 20 and the outer jacket 21 can be electrically connected to each other even in the unlocked state.

At the time of the secondary collision, the second portion 52 of the elastic member 50 comes into contact with the attached component 35 and is elastically deformed. Thus, the elastic member 50 does not hinder impact absorbing movement of the inner jacket 20 with respect to the outer jacket 21 at the time of the secondary collision. At the time of the secondary collision, the second portion 52 comes into contact with the attached component 35 and is elastically deformed. Consequently, part of the impact made at the time of the secondary collision can be absorbed.

Figure 7:
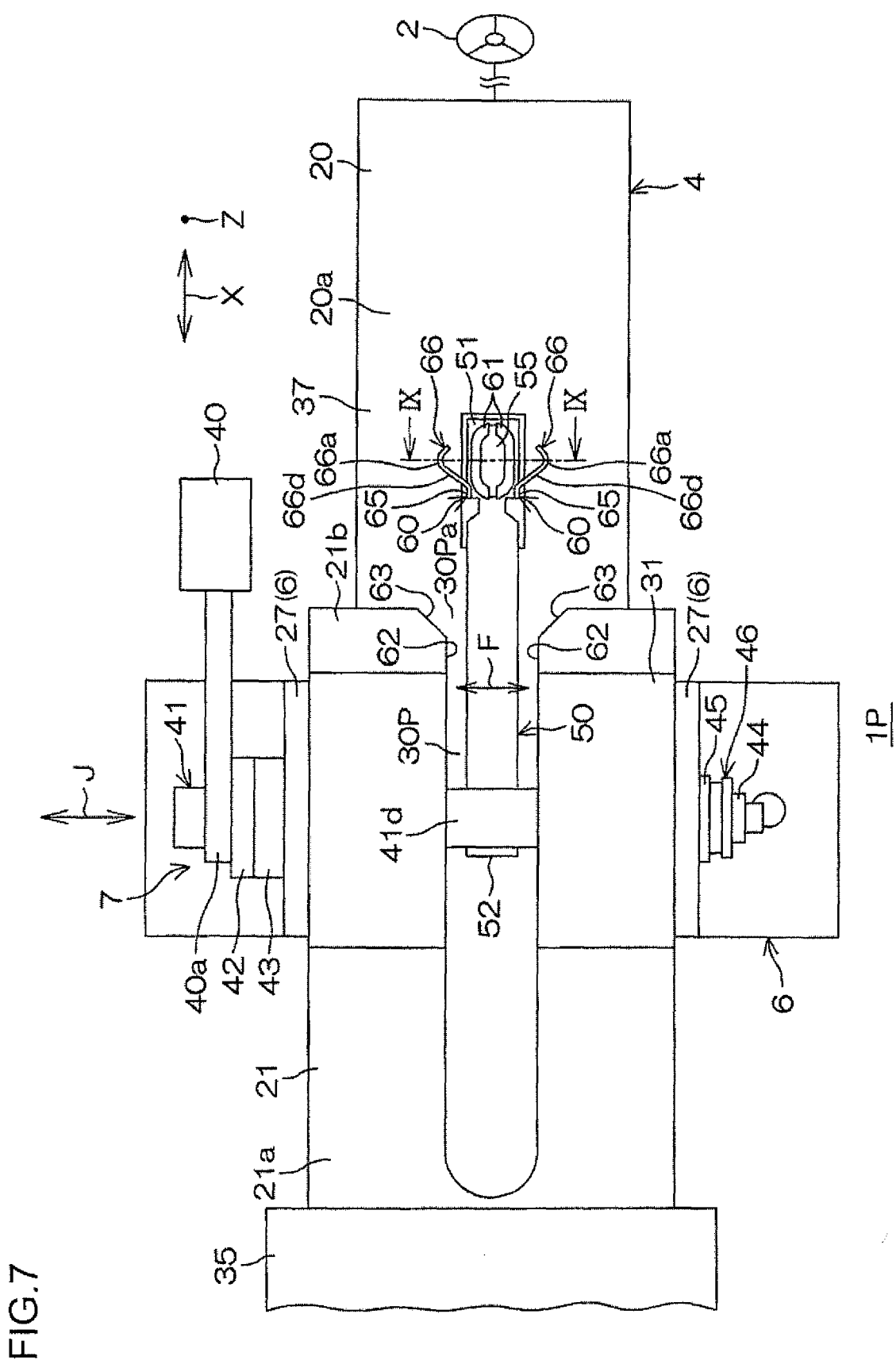
FIG. 7 is a diagram of peripheries of a clamping mechanism in a steering system according to a second embodiment of the present invention as viewed from below in the tilt direction.

FIG. 7 is a diagram of peripheries of the clamping mechanism 7 of a steering system 1P according to a second embodiment of the invention as viewed from below in the tilt direction Z. FIG. 7 illustrates that the column jacket 4 has been maximally extended. The steering system 1P in the second embodiment depicted in FIG. 7 is different from the steering system 1 in the first embodiment depicted in FIG. 3 mainly in the following points. The steering system 1P in the second embodiment includes a first elastic member 50P and second elastic members 60. The first elastic member 50P has the same configuration as the elastic member 50 in the first embodiment. The second elastic members 60 are formed integrally with the first elastic member SOP by press molding or the like using a single member. A pair of reinforcement members 61 that reinforces the engagement member 55 is fixed to the engagement member 55 of the steering system 1P of the second embodiment. In the second embodiment, an axial slit 30P that is a slit in the outer jacket 21 includes an opening end 30Pa formed at an end (end in the axial direction) 21b of the outer jacket 21 that is closer to the steering member 2 in the axial direction X; the opening end 30Pa is open in a tapered shape.

The axial slit 30P has a pair of inner edges 62. The inner edges 62 extend in the axial direction X such that they face each other in a direction orthogonal to the axial direction X. The direction in which the inner edges 62 face each other is referred to as a facing direction F. The facing direction F is parallel to the axial direction J. Each of the inner edges 62 at the opening end 30Pa of the axial slit 30P includes a tapered portion 63 inclined to the axial direction X. The pair of the second elastic members 60 includes a pair of support portions 65 and a pair of elastic tongue pieces 66. The support portions 65 extend from the first portion 51 of the first elastic member 50P. Each of the elastic tongue pieces 66 is supported in a cantilevered manner by the corresponding support portion 65.

Figure 8:
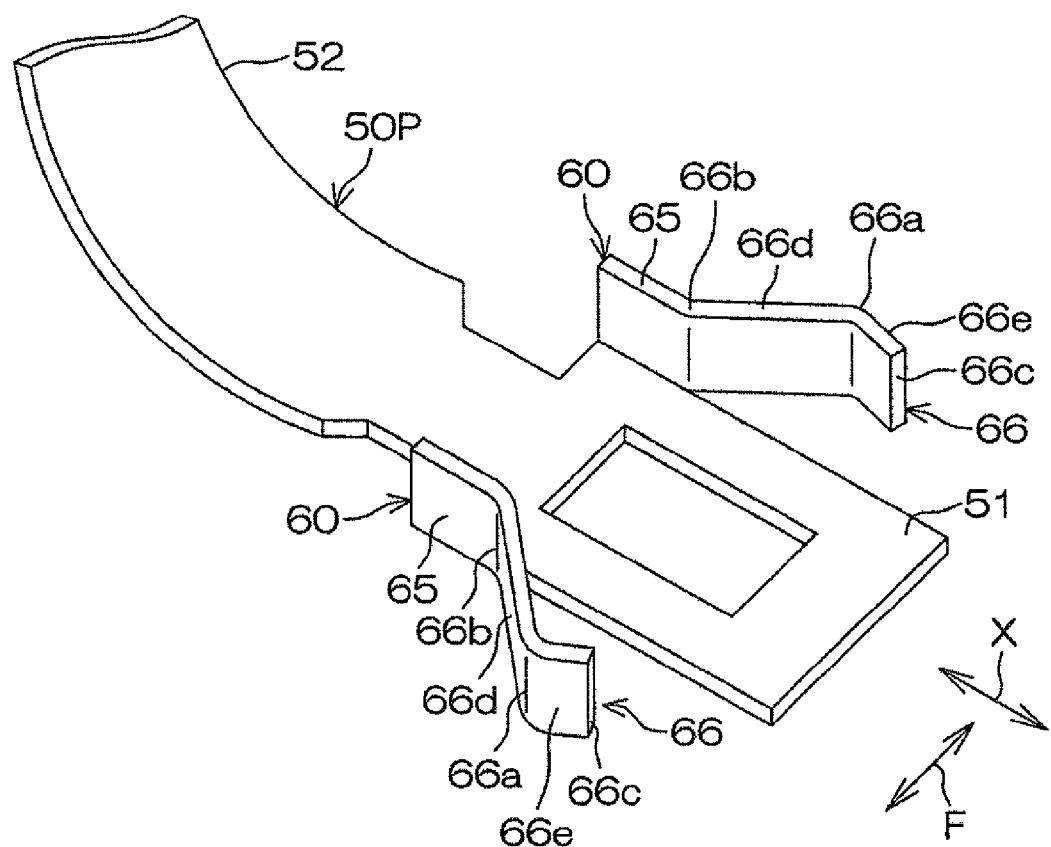
FIG. 8 is a perspective view of a first elastic member and second elastic members that are integrally formed using a single member.

As seen in FIG. 8 that is a perspective view of the first elastic member 50P and the second elastic members 60, the first portion 51 is between the support portions 65 in the facing direction F. The elastic tongue pieces 66 are shaped like chevrons protruding in the opposite directions in the facing direction F. Specifically, each of the elastic tongue pieces 66 includes a base end 66b, a distal end 66c, and a top portion 66a. The base end 66b is supported by the support portion 65. The distal end 66c is on the opposite side from the base end 66b. The top portion 66a is located between the base end 66h and the distal end 66c and curved to protrude outward. Each of the elastic tongue pieces 66 further includes a first inclined portion 66d and a second inclined portion 66e. The first inclined portion 66d connects the top portion 66a and the base end 66b together. The second inclined portion 66e connects the top portion 66a and the distal end 66c together. The first inclined portion 66d and the second inclined portion 66e are disposed at both sides of the top portion 66a in the axial direction X and inclined in opposite directions in the axial direction X.

As seen in FIG. 7, each first inclined portion 66d on the opposite side from the steering member 2 in the axial direction X faces the tapered portion 63 in the axial direction X. The first portion 51 of the first elastic member 50P formed integrally with the second elastic members 60 using the single member is engaged with the predetermined area 36 of the outer periphery 20a of the inner jacket 20 by the engagement member 55. Thus, the second elastic members 60 are supported by the inner jacket 20 so as to be able to move along with the inner jacket 20 in the axial direction X during the telescopic adjustment.

Figure 9:
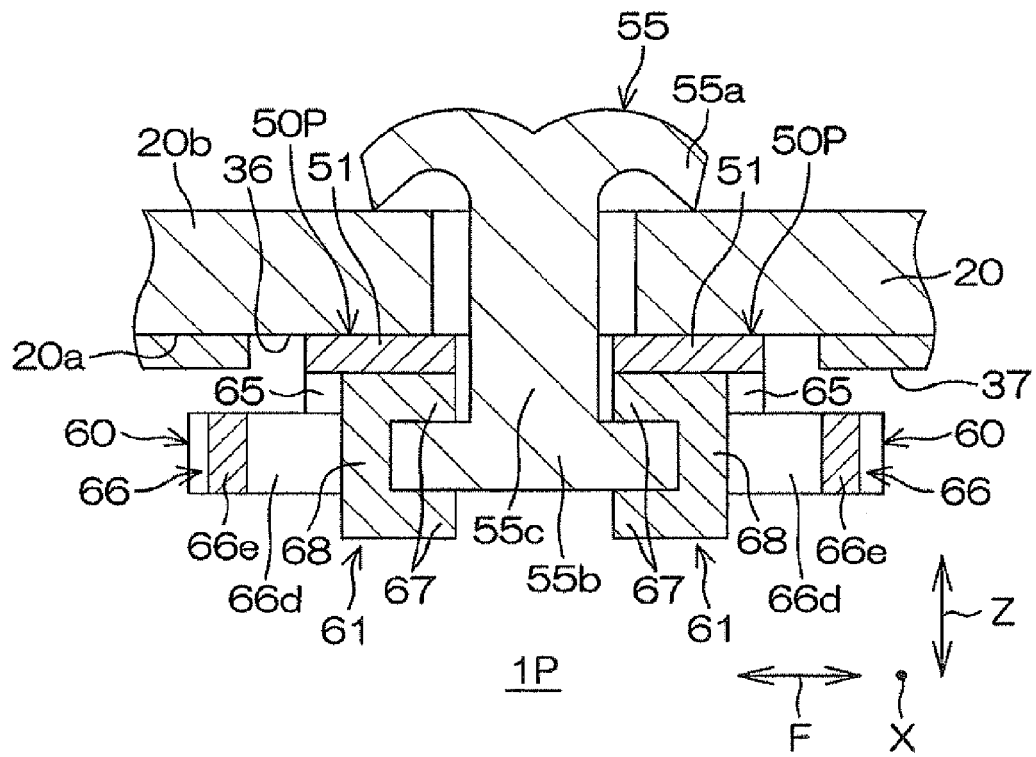
FIG. 9 is a sectional view taken along a line IX-IX in FIG. 7.

The reinforcement members 61 have a higher rigidity than the engagement member 55. As seen in FIG. 9 that is a sectional view taken along line IX-IX in FIG. 7, the reinforcement members 61 are fitted on the reception portion 55b of the engagement member 55 such that the reception portion 55b is sandwiched between the reinforcement members 61 in the facing direction F. Each of the reinforcement members 61 includes a pair of sandwiching portions 67 and a coupling portion 68. The sandwiching portions 67 sandwich the reception portion 55b of the engagement member 55. The coupling portion 68 couples the sandwiching portions 67 together. A sandwiching direction of the sandwiching portions 67 coincides with a direction in which the reception portion 55b and the elastic-deformation portion 55a of the engagement member 55 sandwich the wall portion 20b of the inner jacket 20.

Figure 10:
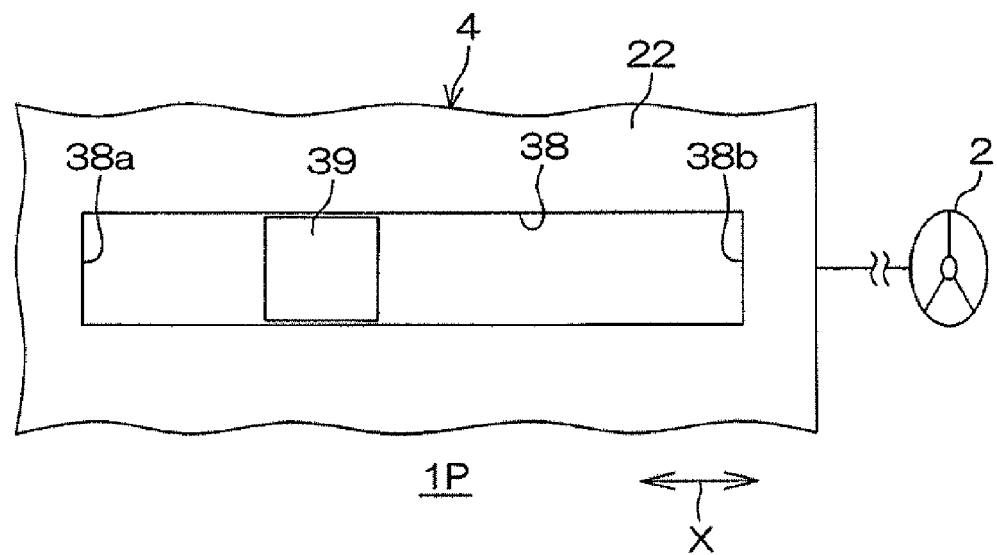
FIG. 10 is a diagram of peripheries of a telescopic stopper from above in the tilt direction.

Now, the guided protrusion 39 serving as a telescopic stopper and the guide groove 38 will be described in detail. FIG. 10 is a diagram of peripheries of the guided protrusion 39 as viewed from above in the tilt direction Z. As seen in FIG. 10, the guided protrusion 39 regulates an extension and contraction stroke range (telescopic stroke range) of the column jacket 4 during the telescopic adjustment. Specifically, the telescopic adjustment toward a contraction side (in a telescopic short direction) is performed to contract the column jacket 4 to a contraction end of the telescopic stroke range. Thus, the guided protrusion 39 comes into contact with a groove end 38a of the guide groove 38 located remote from the steering member 2 in the axial direction X. In contrast, the telescopic adjustment toward an extension side (in a telescopic long direction) is performed to extend the column jacket 4 to an extension end of the telescopic stroke range. Thus, the guided protrusion 39 comes into contact with a groove end 38b of the guide groove 38 located close to the steering member 2 in the axial direction X.

At the time of the secondary collision, the column jacket 4 is contracted to cause the guided protrusion 39 to collide against the groove end 38a of the guide groove 38 and to be impacted. The guided protrusion 39 is broken and a separation load is generated. The column jacket 4 depicted in FIG. 4 is telescopically adjusted from the maximally extended state toward the contraction side. Thus, the second elastic members 60 are inserted into the axial slit 30P before the column jacket 4 is contracted to the contraction end of the telescopic stroke range.

Figure 11A:
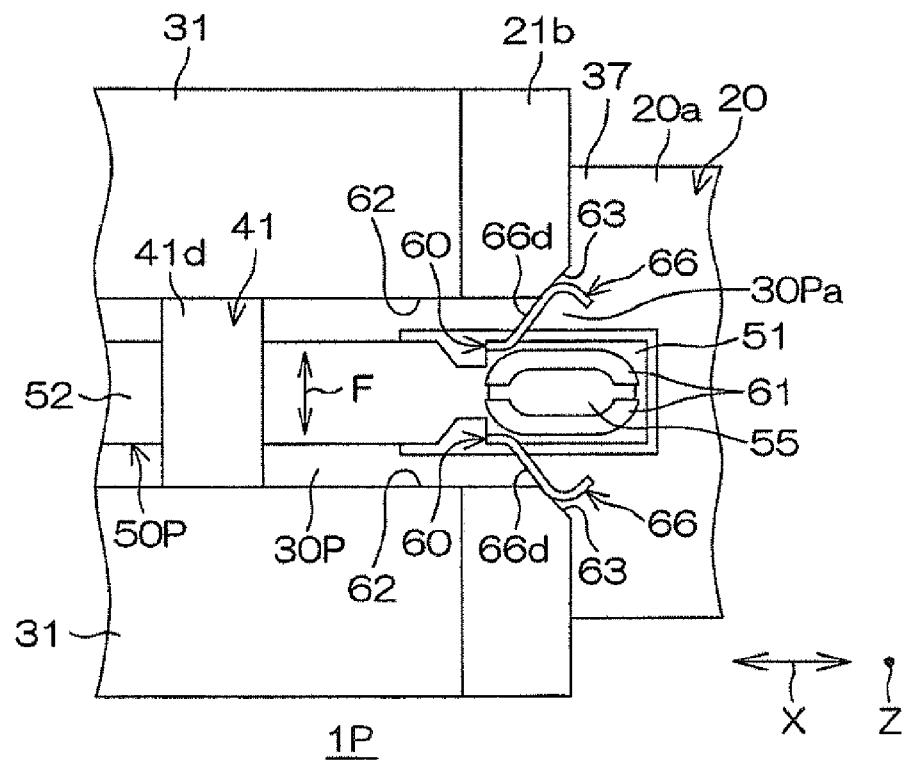
FIG. 11A and FIG. 11B are schematic diagrams depicting peripheries of the second elastic members in which telescopic adjustment has been performed toward a contraction side, FIG. 11A illustrating that the second elastic members have reached the vicinity of an opening in an axial slit and FIG. 11B illustrating that the second elastic members have been inserted into the axial slit.
Figure 11B:
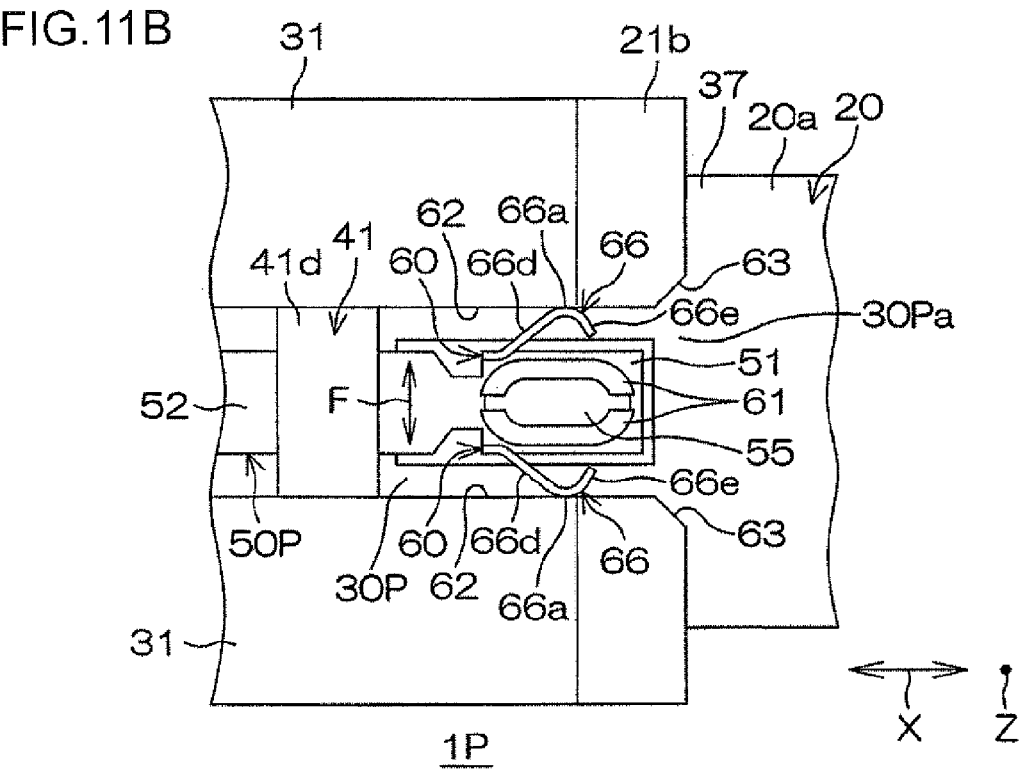

FIGS. 11A and 11B are schematic diagrams depicting the state of peripheries of the second elastic members 60 when the telescopic adjustment toward the contraction side has been performed. FIG. 11A illustrates that the second elastic members 60 have reached the vicinity of the opening end 30Pa of the axial slit 30P. FIG. 11B illustrates that the second elastic members 60 have been inserted into the axial slit 30P. As seen in FIG. 11 A, the first inclined portions 66d of the elastic tongue pieces 66 of the second elastic members 60 face the respective tapered portions 63 of the inner edges 62 of the axial slit 30P as described above. Thus, when the second elastic members 60 reach the opening end 30Pa of the axial slit 30P as a result of the telescopic adjustment, the first inclined portions 66d of the elastic tongue pieces 66 come into contact with the respective tapered portions 63 of the inner edges 62. Consequently, the elastic tongue pieces 66 are gradually deflected by the respective tapered portions 63. As depicted in FIG. 11 B, when the second elastic members 60 are inserted into the axial slit 30P, the top portions 66a of the elastic tongue pieces 66 are elastically pressed in the facing direction F by the respective inner edges 62. Thus, when moving through the axial slit 30P in the axial direction X, the elastic tongue pieces 66 of the second elastic members 60 come into slide-contact with the inner edges 62 of the axial slit 30P while being pressed.

In the second embodiment, the elastic tongue pieces 66 of the second elastic members 60 come into slide-contact with the inner edges 62 of the axial slit 30P while being pressed, during the telescopic adjustment toward the contraction side. Thus, a contraction speed of the column jacket 4 during the telescopic adjustment can be reduced. Accordingly, although at the contraction end of the telescopic stroke range of the column jacket 4, the guided protrusion 39 collides against the groove end 38a of the guide groove 38 in the axial direction X, hammering sound generated when contraction of the column jacket 4 is restricted can be reduced. Impact applied to the guided protrusion 39 can also be mitigated.

Since during the telescopic adjustment, the impact applied to the guided protrusion 39 is mitigated, it is possible to suppress a decrease in the strength of the guided protrusion 39 resulting from the telescopic adjustment. Consequently, at the time of the secondary collision, the guided protrusion 39 is broken to allow a needed separation load to be generated. Since during the telescopic adjustment, the impact applied to the guided protrusion 39 is mitigated, it is not necessary to provide a damper that absorbs impact at the groove end 38a of the guide groove 38 in the axial direction X. Therefore, the second embodiment enables a reduction in the number of components as compared to a case where a damper is provided at the groove end 38a.

During the telescopic adjustment toward the contraction side, the second elastic members 60 are smoothly introduced into the axial slit 30P through the tapered opening end 30Pa.

Thus, the telescopic adjustment toward the contraction side can be smoothly performed. Providing the first elastic member 50P and the second elastic members 60 as a single member enables a reduction in the number of components.

Each of the elastic tongue pieces 66 includes a second inclined portion 66e provided closer to the steering member 2 than the top portion 66a. Thus, during the telescopic adjustment toward the extension side, the elastic tongue pieces 66 can be restrained from being caught on the inner edges 62. The invention is not limited to the above-described embodiments. Various changes may be made to the embodiments within the scope of the claims.

For example, the steering system 1 of the first embodiment may be of a type that is unable to be telescopically adjusted. The first portion 51 of the elastic member 50 may be engaged with the slit inside portion 41d of the clamping shaft 41 so as to be energized and the second portion 52 of the elastic member 50 may come into slide-contact with the predetermined area 36.

Unlike the first embodiment and the second embodiment, the first portion 51 may be engaged or fixed by bolting or welding instead of being engaged by the engagement member 55. The second portion 52 of the elastic member 50 need not be shaped like a circular arc with a uniform radius of curvature but may be elliptic. A portion that is not curved but is linear or a bent portion may be provided between the first portion 51 and the second portion 52.

A portion of the clamping shaft 41 with which the second portion 52 of the elastic member 50 may include, besides the clamping shaft 41 itself, a member that is provided on the clamping shaft 41 and that can be energized. The elastic member 50 may be a spring other than a leaf spring, for example, a coil spring. Unlike the second embodiment, the first elastic member 50P and the second elastic members 60 may be formed separately from each other. In this case, the second elastic members 60 may not be conductive.

Figure 12A:
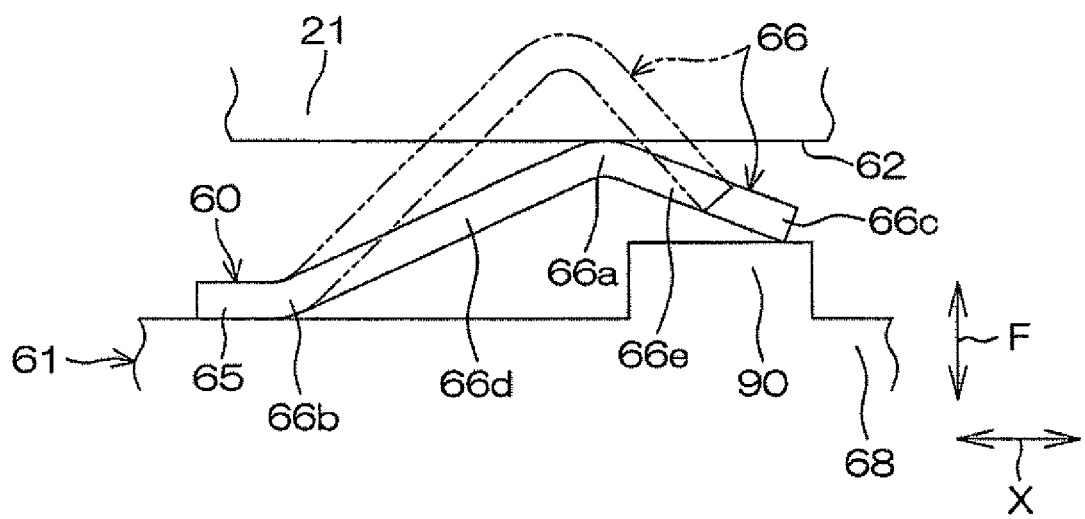
FIG. 12A is a diagram schematically depicting peripheries of one of the second elastic members in a first variation of the second embodiment.
Figure 12B:
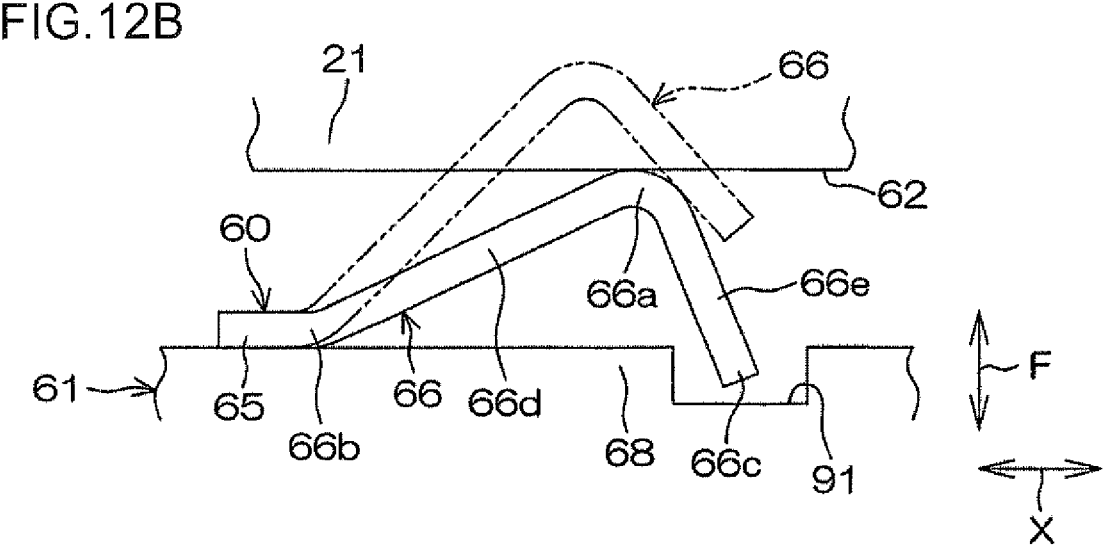
FIG. 12B is a diagram schematically depicting peripheries of one of the second elastic members in a second variation of the second embodiment.

When the first elastic member 50P and the second elastic members 60 are formed separately from each other, the first elastic member 50P and the second elastic members 60 may be jointly fastened by bolting without using the engagement member 55. FIG. 12A is a diagram schematically depicting peripheries of one of the second elastic members 60 in a first variation of the second embodiment. FIG. 12B is a diagram schematically depicting peripheries of one of the second elastic members 60 in a second variation of the second embodiment. In FIG. 12A and FIG. 12B, the elastic tongue piece 66 that has not been elastically deformed yet is shown by a long dashed double-short dashed line.

As depicted in the first variation in FIG. 12A and the second variation in FIG. 12B, the reinforcement member 61 may be configured to allow adjusting load characteristics of the elastic tongue piece 66 of the second elastic member 60 as needed. Specifically, on the coupling portion 68 of the reinforcement member 61, a protrusion 90 is formed which faces the distal end 66c of the elastic tongue piece 66 of the second elastic member 60 in the facing direction F as seen in FIG. 12A. Adjusting the height of the protrusion 90 in the facing direction F allows the distal end 66c of the elastic tongue piece 66 to come into contact with the protrusion 90 the height of which is adjusted, while the second elastic member 60 in slide-contact with the inner edge 62. This allows adjusting the amount by which the second inclined portion 66e is deformed in a bending manner with respect to the first inclined portions 66d. As a result, the load characteristics of the elastic tongue piece 66 can be adjusted.

As seen in FIG. 12B, in the coupling portion 68 of the reinforcement member 61, a recessed portion 91 is formed which faces the distal end 66c of the elastic tongue piece 66 of the second elastic member 60 in the facing direction F. Adjusting the depth of the recessed portion 91 in the facing direction F allows preventing contact between the distal end 66c and a bottom portion of the recessed portion 91 while the second elastic members 60 is in slide-contact with the inner edge 62. Thus, the load characteristics of the elastic tongue piece 66 can be adjusted.

Unlike the second embodiment, the first elastic member SOP may be omitted from the steering system 1. Unlike the second embodiment, the second elastic members 60 may come into slide-contact with inner edges (corresponding to surfaces facing the clamped portions 31) of the axial slit 30P defined between the clamped portions 31 in the outer jacket 21.

The steering systems 1 and 1P may include a tooth lock mechanism in which teeth mesh with one another to lock the position of the inner jacket 20 with respect to the outer jacket 21. In the steering systems 1 and IP, the clamping shaft 41 is disposed below the inner jacket 20 in the tilt direction Z. However, the invention is applicable to a steering system in which the clamping shaft 41 is disposed above the inner jacket 20 in the tilt direction Z.

The steering systems 1 and 1P are not limited to a manual steering system in which steering of the steering member 2 is not assisted but may be an column-assist electric power steering system (C-EPS) in which steering of the steering member 2 is assisted using an electric motor.

What is claimed is:

1. A steering system comprising:
   a steering shaft to which a steering member is coupled and which is enabled to extend and contract in an axial direction;
   a column jacket including an outer jacket that includes a slit and a pair of clamped portions disposed on both sides of the slit and an inner jacket fitted into the outer jacket and coated with an insulating coating layer all along an outer periphery of the inner jacket except for a predetermined area, the column jacket supporting the steering shaft so that the steering shaft is rotatable and being enabled to extend and contract in the axial direction;
   a bracket that supports the clamped portions of the outer jacket and that is fixed to a vehicle body;
   a clamping mechanism including a clamping shaft that is supported in clamping shaft insertion holes in the clamped portions so as to be energized and that clamps the clamped portions via the clamping shaft so that the outer jacket holds the inner jacket; and
   a conductive elastic member including a first portion engaged with one of a slit inside portion of the clamping shaft that is positioned in the slit and the predetermined area so as to be energized and a second portion that slide-contacts the other of the slit inside portion and the predetermined area.

2. The steering system according to claim 1, wherein the first portion of the elastic member is engaged with the predetermined area of the inner jacket so as to be energized,
   the inner jacket and the outer jacket are slidable relative to each other to allow telescopic adjustment,
   within a telescopic adjustment range, the elastic member is elastically deformed such that the second portion is kept in contact with slit inside portion of the clamping shaft.

3. The steering system according to claim 2, wherein, at a time of a secondary collision, the elastic member is elastically deformed when the second portion of the elastic member having moved along with the inner jacket comes into contact with an attached component attached to the outer jacket.

4. The steering system according to claim 1, further comprising:
   a first elastic member as the elastic member;
   a second elastic member that is supported by the inner jacket so as to be movable along with the inner jacket during telescopic adjustment, or extension and contraction of the column jacket, and that is inserted into an axial slit as the slit during the telescopic adjustment toward a contraction side, so that the second elastic member comes into slide-contact with inner edges of the axial slit while being pressed; and
   a telescopic stopper that restricts a contraction end of an extension and contraction stroke range of the column jacket during the telescopic adjustment.

5. The steering system according to claim 4, wherein the axial slit includes an opening end that lies at an end of the outer jacket in the axial direction and that is open in a tapered manner.

6. The steering system according to claim 4, wherein the first elastic member and the second elastic member are integrated together.

* * * * *